US010870385B2

(12) United States Patent
Rack et al.

(10) Patent No.: US 10,870,385 B2
(45) Date of Patent: Dec. 22, 2020

(54) VEHICLE HEADLIGHT SYSTEM COMPRISING A MASTER CONTROL APPARATUS AND A SLAVE CONTROL APPARATUS WHEREIN THE SLAVE CONTROL APPARATUS IS DESIGNED TO EXECUTE AN APPLICATION SOFTWARE FOR THE PURPOSE OF ACTUATING A HEADLIGHT SYSTEM COMPONENT

(71) Applicant: Bayerische Motoren Werke Aktiengesellschaft, Munich (DE)

(72) Inventors: Viktor Rack, Pfaffenhofen a. d. Ilm (DE); Mario Werkstetter, Munich (DE); Thomas Trumpp, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 43 days.

(21) Appl. No.: 16/152,598

(22) Filed: Oct. 5, 2018

(65) Prior Publication Data
US 2019/0031082 A1   Jan. 31, 2019

Related U.S. Application Data

(63) Continuation of application No. PCT/EP2017/056604, filed on Mar. 21, 2017.

(30) Foreign Application Priority Data

Apr. 6, 2016   (DE) .................. 10 2016 205 683

(51) Int. Cl.
*B60Q 1/04* (2006.01)
*B60Q 1/14* (2006.01)

(52) U.S. Cl.
CPC ............. *B60Q 1/04* (2013.01); *B60Q 1/1407* (2013.01); *B60Q 2300/05* (2013.01)

(58) Field of Classification Search
CPC ..... B60Q 1/04; B60Q 1/1407; B60Q 2300/05
See application file for complete search history.

(56) References Cited

U.S. PATENT DOCUMENTS 6,016,035 A    1/2000 Eberspaecher et al.
7,541,743 B2 * 6/2009 Salmeen ................ B60Q 1/085
                                                      315/77

(Continued)

FOREIGN PATENT DOCUMENTS

DE    100 37 131 A1    2/2002
DE    103 55 046 B4    2/2006

(Continued)

OTHER PUBLICATIONS

International Search Report (PCT/ISA/210) issued in PCT Application No. PCT/EP2017/056604 dated Jul. 12, 2017 with English translation (six (6) pages).

(Continued)

*Primary Examiner* — Borna Alaeddini
(74) *Attorney, Agent, or Firm* — Crowell & Moring LLP

(57) ABSTRACT

A lighting device has a master control apparatus and at least one slave control apparatus connected to the master control apparatus via a bus system. The slave control apparatus is designed to execute application software for actuating a headlight system component. The master control apparatus is designed to upload the application software onto the slave control apparatus and/or to actuate and/or diagnose the slave control apparatus.

19 Claims, 4 Drawing Sheets

(56) References Cited

U.S. PATENT DOCUMENTS

| | | | |
|---|---|---|---|
| 8,400,061 B2* | 3/2013 | Kuang | H05B 45/10 |
| | | | 315/77 |
| 10,547,157 B2* | 1/2020 | Werkstetter | H05B 45/00 |
| 2002/0158583 A1* | 10/2002 | Lys | B60Q 1/26 |
| | | | 315/82 |
| 2005/0111231 A1 | 5/2005 | Crodian et al. | |
| 2005/0174473 A1 | 8/2005 | Morgan et al. | |
| 2013/0093324 A1 | 4/2013 | Brown et al. | |
| 2013/0264942 A1* | 10/2013 | Kuang | H05B 47/11 |
| | | | 315/77 |
| 2017/0325322 A1* | 11/2017 | Bachmann | H04L 41/0853 |
| 2018/0270927 A1* | 9/2018 | Daroussin | B60Q 1/04 |
| 2018/0310377 A1* | 10/2018 | Nietfeld | H05B 33/0818 |

FOREIGN PATENT DOCUMENTS

| | | | | |
|---|---|---|---|---|
| DE | 10 2005 055 009 A1 | 5/2007 | | |
| DE | 10 2006 021 694 A1 | 11/2007 | | |
| DE | 102006021694 B4 * | 10/2012 | | F21S 41/141 |
| EP | 0 870 644 A2 | 10/1998 | | |
| EP | 1 748 360 A1 | 1/2007 | | |
| EP | 2 086 084 A1 | 8/2009 | | |

OTHER PUBLICATIONS

German-language Written Opinion (PCT/ISA/237) issued in PCT Application No. PCT/EP2017/056604 dated Jul. 12, 2017 (six (6) pages).

German-language Search Report issued in counterpart German Application No. 10 2016 205 683.2 dated Jan. 16, 2017 with partial English translation (11 pages).

\* cited by examiner

VEHICLE HEADLIGHT SYSTEM COMPRISING A MASTER CONTROL APPARATUS AND A SLAVE CONTROL APPARATUS WHEREIN THE SLAVE CONTROL APPARATUS IS DESIGNED TO EXECUTE AN APPLICATION SOFTWARE FOR THE PURPOSE OF ACTUATING A HEADLIGHT SYSTEM COMPONENT

CROSS REFERENCE TO RELATED APPLICATIONS

This application is a continuation of PCT International Application No. PCT/EP2017/056604, filed Mar. 21, 2017, which claims priority under 35 U.S.C. § 119 from German Patent Application No. 10 2016 205 683.2, filed Apr. 6, 2016, the entire disclosures of which are herein expressly incorporated by reference.

BACKGROUND AND SUMMARY OF THE INVENTION

The invention relates to a lighting device of a vehicle, having a master control apparatus and at least one slave control apparatus, wherein the slave control apparatus is connected to the master control apparatus via a bus system.

Modern vehicles often have complex vehicle headlights with integrated control devices. Since the control devices are permanently installed in the vehicle headlight, it is necessary, even in the case of a pure software error, to remove the entire vehicle headlight from the vehicle. This is complicated and gives rise to high costs.

The object on which the invention is based is to provide a lighting device of a vehicle which can be maintained in a simple and cost-effective manner.

The object is achieved by the features of the independent claim. Advantageous configurations are characterized in the dependent claims.

The invention is distinguished by a lighting device of a vehicle, having a master control apparatus and at least one slave control apparatus, wherein the slave control apparatus is connected to the master control apparatus via a bus system. The slave control apparatus is designed to execute application software for the purpose of actuating a headlight system component. The master control apparatus is designed to install the application software on the slave control apparatus and/or to actuate and/or diagnose the slave control apparatus.

The vehicle is, for example, an automobile or a motorcycle. The lighting device is, for example, a front lighting device or a rear lighting device.

The master control apparatus may also be referred to as a superordinate control apparatus. The slave control apparatus may also be referred to as a subordinate control apparatus.

The operation of actuating the headlight system component comprises, in particular, actuating at least one light source, such as LEDs or laser light sources, and/or reading sensors and/or actuating thermistors, such as NTCs, and/or actuating pivoting devices or other headlight system components. The application software is therefore provided, in particular, for predefined operation of the headlight, for example, in order to implement a high-beam assistant and/or cornering light. The application software of the slave control apparatus is, in particular, equipment-dependent application software which is therefore not the same in every vehicle.

The bus system is, for example, a CAN bus (Controller Area Network, in particular according to ISO 11898) and/or a Flexray bus, in particular according to ISO 17458-1 to 17458-5, and/or an Ethernet bus, in particular according to IEEE standard 802.3, and/or another automotive-qualified bus system.

By virtue of the fact that the application software can be installed on the slave control apparatus by the master control apparatus, it is not necessary to remove the entire headlight in the event of an error. It is often adequate to install new application software. Furthermore, the application software can therefore be easily updated. The maintenance of the headlight is therefore simple, cost-effective and saves time.

According to one optional configuration, the lighting device has a headlight housing, wherein the slave control apparatus and the headlight system component are arranged in the headlight housing and the master control apparatus is arranged outside the headlight housing.

Such a design makes it possible to arrange the slave control apparatus close to the light sources to be actuated, with the result that an uncomplicated design is possible.

In an alternative configuration, the master control apparatus is arranged inside the headlight housing.

According to another optional configuration, the slave control apparatus is designed to execute application software for the purpose of actuating an LED vehicle headlight.

Modern LED vehicle headlights, in particular, often require one or more slave control apparatuses.

According to another optional configuration, the slave control apparatus is designed to execute application software for the purpose of actuating a laser vehicle headlight.

Like LED vehicle headlights, laser vehicle headlights often require one or more slave control apparatuses.

According to another optional configuration, the slave control apparatus is designed to execute application software for the purpose of actuating a matrix vehicle headlight.

Like LED vehicle headlights or laser vehicle headlights, matrix vehicle headlights often require one or more slave control apparatuses.

According to another optional configuration, the slave control apparatus is designed to execute application software for the purpose of actuating any desired headlight system components.

According to another optional configuration, the master control apparatus is a front headlight master control apparatus or a rear light master control apparatus.

Many different light actuation means and therefore types of application software, which are therefore also more susceptible to errors, are required, in particular, in the front headlight. It is therefore advantageous to provide the lighting device in the front headlight, in particular. A similar situation applies to the rear light.

According to another optional configuration, the master control apparatus is designed to overwrite a flash memory of a BIOS of the slave control apparatus with firmware in order to install the application software on the slave control apparatus.

Such overwriting, which can also be referred to as flashing, can also be carried out in real time, for example, as part of the AUTOSAR 4 (AUTomotive Open System ARchitecture). Such flashing makes it possible to save additional costs since the flash memory of the slave control apparatus must have only a small size for this purpose.

In particular, the slave control apparatus has a boot loader which is adapted for this purpose and communicates with the master control apparatus, with the result that the application software can be installed.

According to another optional configuration, the master control apparatus is designed to carry out an error diagnosis of the slave control apparatus.

The error diagnosis comprises, in particular, the possibility of determining which version of the application software has been installed and/or the determination of error states of the slave control apparatus. In addition, if the master control apparatus cannot diagnose the slave control apparatus (connection or hardware error), the master control apparatus can set additional error memory entries, for example, which provide sufficiently detailed information relating to the error.

In order to be able to carry out the error diagnosis, the slave control apparatus may have, in particular, its own diagnostic address which is known to the overall vehicle and to a tester attached to the vehicle (public) or is directly known only to the master control apparatus (private).

According to another optional configuration, the lighting device has a plurality of slave control apparatuses, wherein the master control apparatus is designed to install the application software on the slave control apparatuses in a parallel manner and/or to actuate and/or diagnose the slave control apparatuses in a parallel manner.

As a result, particularly fast maintenance is possible.

According to another optional configuration, the master control apparatus is designed to communicate with an external diagnostic apparatus.

The diagnostic apparatus can also be referred to as a tester. The diagnostic apparatus is, in particular, a mobile apparatus which can be affixed to the vehicle or communicates wirelessly with the vehicle.

This makes it possible, in particular, to externally install the application software and to carry out the error diagnosis.

In summary, the lighting device additionally has the following advantages. The costs of the lighting device are reduced. Since the application software is provided in the slave control apparatus, basic functions can be implemented by the master control apparatus. This enables a cost-effective standard variant for the base. It is also possible to partition all equipment parts into separate slave control apparatuses which are installed only if this equipment, for example, laser vehicle headlights, is selected. Therefore, these parts do not need to be held in the master control apparatus, with the result that the master control apparatus does not have to have the maximum equipment, which would be associated with high expenditure without any actual benefit. On account of the bus structure in comparison with discrete actuation, many copper lines are dispensed with, which are very expensive, in terms of quantity, under certain circumstances. A smaller number of cables results in smaller and therefore favorable connectors being able to be used.

Furthermore, advantages result in terms of the weight of the lighting device. As a result of the fact that electronic parts can be partitioned on the basis of the equipment variant, the master control apparatus remains small and lightweight. On account of the bus structure in comparison with discrete actuation, many lines which carry weight are dispensed with. A smaller number of cables results in smaller and therefore more lightweight connectors being able to be used.

Furthermore, advantages result in terms of the function. The new architecture of the lighting device makes it possible for different slave control apparatuses which serve different functions, for example, actuation of a laser headlight or a matrix headlight, to be variably connected with respect to the master control apparatus. Since the slave control apparatuses are connected to a bus system, many of these slave control apparatuses can be combined in any desired manner depending on the required functions without the entire lighting device being overloaded with cables which would be required in the case of discrete actuation. As a result of the fact that the slave control apparatuses are connected to the master control apparatus via a bus system, they can be configured in any desired manner using software and functions can be extended or corrected by software without using new hardware.

Exemplary embodiments of the invention are explained in more detail below on the basis of the schematic drawings, in which:

Other objects, advantages and novel features of the present invention will become apparent from the following detailed description of one or more preferred embodiments when considered in conjunction with the accompanying drawings.

BRIEF DESCRIPTION OF THE DRAWINGS

Elements with the same design or function are indicated using the same reference symbols throughout the figures.

DETAILED DESCRIPTION OF THE DRAWINGS

Figure 1:
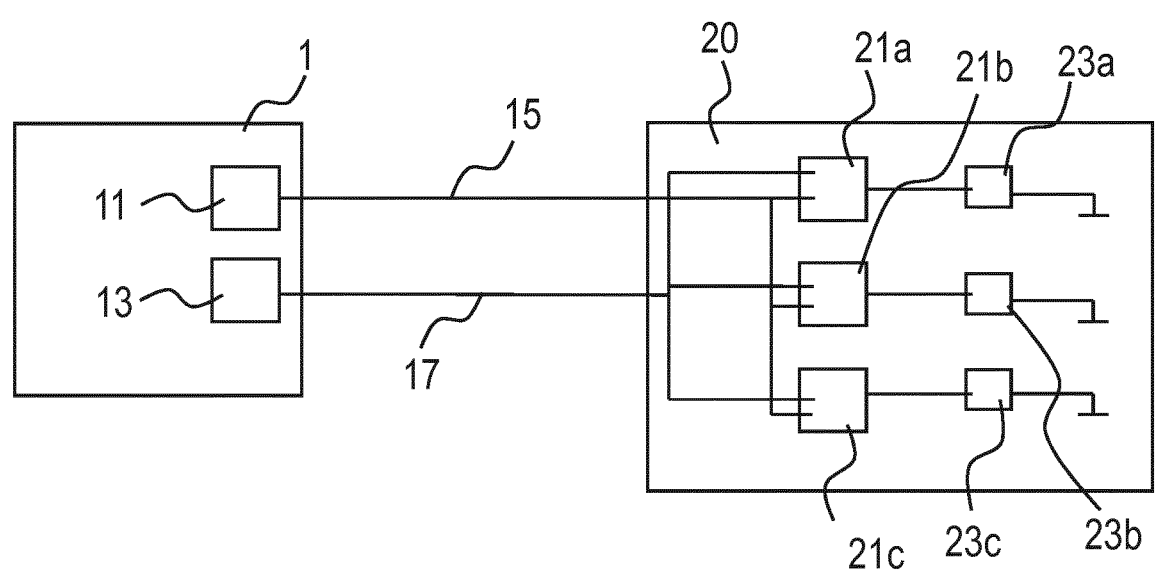
FIG. 1 shows a lighting device of a vehicle.

FIG. 1 shows a lighting device of a vehicle.

The lighting device has a master control apparatus 1. The lighting device also has at least one further slave control apparatus 21*a*, 21*b*, 21*c*.

The slave control apparatus 21*a*, 21*b*, 21*c* is connected to the master control apparatus 1 via a bus system 15.

The master control apparatus 1 is also connected to the slave control apparatus 21*a*, 21*b*, 21*c* by a supply interface 13, by which it can supply the slave control apparatus 21*a*, 21*b*, 21*c* with current/voltage in a switchable manner.

The master control apparatus 1 is designed to install application software on the slave control apparatus 21*a*, 21*b*, 21*c*. For this purpose, the master control apparatus 1 has, in particular, a computing unit (not shown), a program and data memory (not shown) and one or more communication interfaces 11, for example. The program and data memory and/or the computing unit and/or the communication interfaces 11 may be formed in one structural unit and/or distributed among a plurality of structural units.

The master control apparatus 1 is designed, for example, to overwrite a flash memory of a BIOS of the slave control apparatus 21*a*, 21*b*, 21*c* with firmware in order to install the application software on the slave control apparatus 21*a*, 21*b*, 21*c*.

The master control apparatus 1 is a front headlight master control apparatus, for example.

Alternatively or additionally, the master control apparatus 1 is optionally designed to actuate the slave control apparatus 21*a*, 21*b*, 21*c*.

Alternatively or additionally, the master control apparatus 1 is optionally designed to carry out an error diagnosis of the slave control apparatus 21*a*, 21*b*, 21*c*.

In particular, the master control apparatus 1 is designed to communicate with an external diagnostic apparatus for this purpose, for example, via the communication interface 11 and/or via the bus system 15 or a further communication interface and/or a further bus system.

The slave control apparatus 21a, 21b, 21c is designed to execute the application software for the purpose of actuating a headlight system component 23a, 23b, 23c.

The slave control apparatus 21a, 21b, 21c and the headlight system component 23a, 23b, 23c are arranged in a headlight housing 20, for example. The master control apparatus 1 is, in particular, arranged outside the headlight housing 20.

Figure 2:
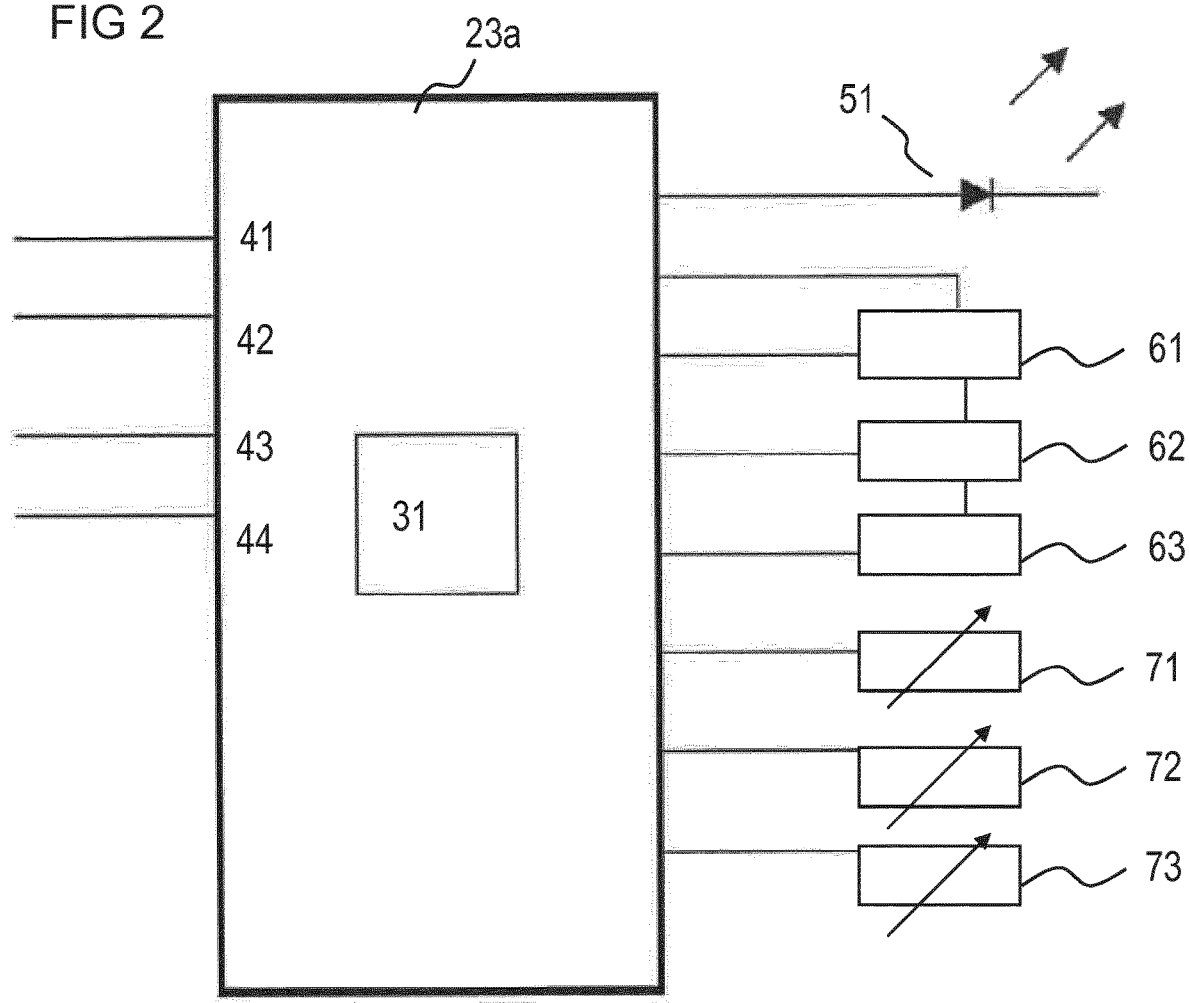
FIG. 2 shows a slave control apparatus.

FIG. 2 shows an embodiment of the slave control apparatus 21a which is designed to execute application software for the purpose of actuating a laser vehicle headlight.

The slave control apparatus 21a in FIG. 2 has, in particular, a computing unit 31, a program and data memory (not shown) and one or more interfaces, for example. The program and data memory and/or the computing unit 31 and/or the interfaces may be formed in one structural unit and/or distributed among a plurality of structural units.

The interfaces comprise, for example, supply connections 41, 42 for supplying voltage to the slave control apparatus 21a.

The interfaces also comprise, for example, one or more bus connections 43, 44 for communicating with the master control apparatus 1.

The interfaces comprise, for example, a connection for actuating a laser light source 51. Alternatively, a plurality of laser light sources 51 may also be provided.

The interfaces also comprise, for example, one or more sensor connections for communicating with sensors 61, 62, 63.

The interfaces comprise, for example, one or more connections of thermistors 71, 72, 73.

Figure 3:
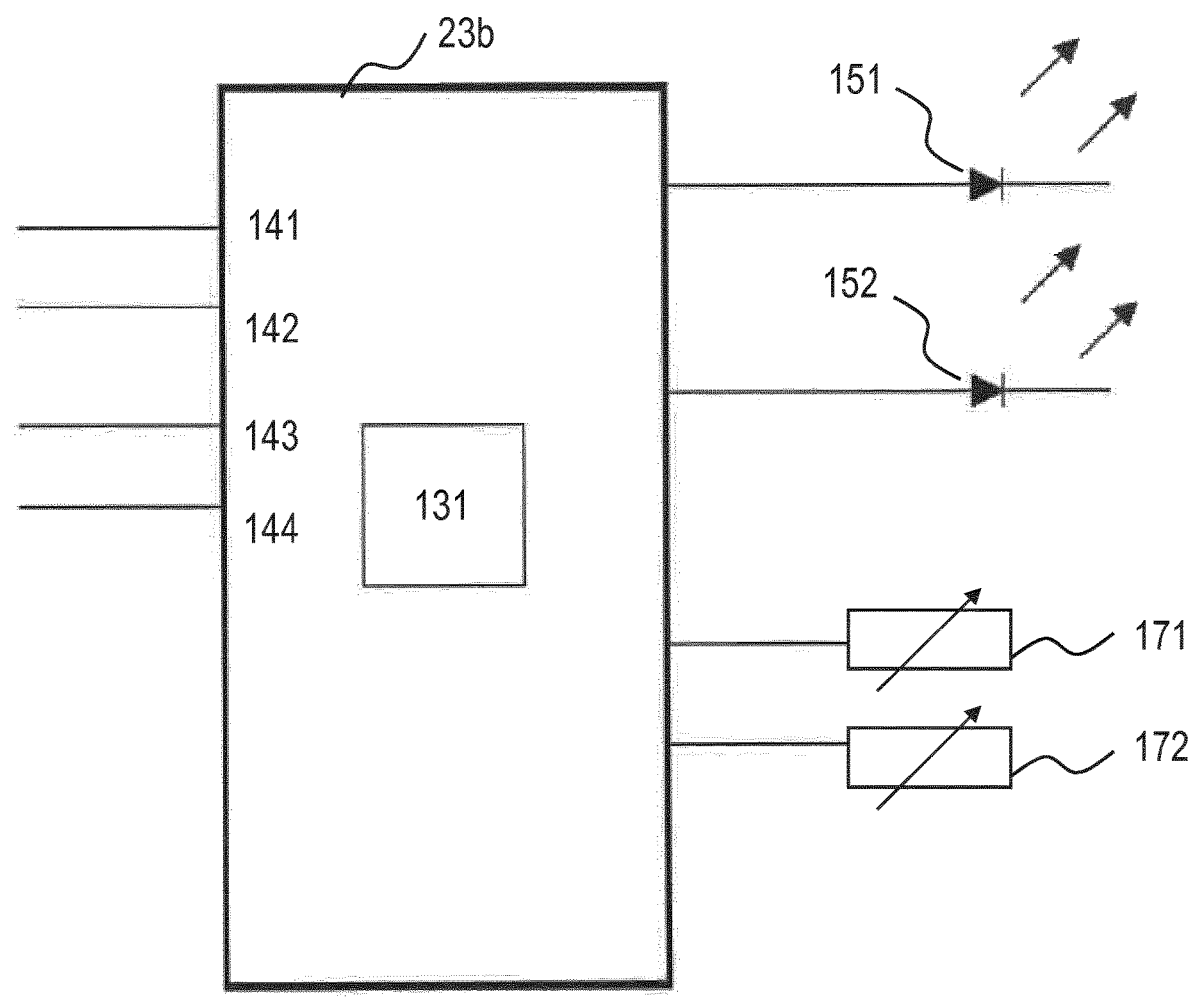
FIG. 3 shows a further slave control apparatus.

FIG. 3 shows an embodiment of the slave control apparatus 21b which is designed to execute application software for the purpose of actuating an LED vehicle headlight.

The slave control apparatus 21b in FIG. 3 has, in particular, a computing unit 131, a program and data memory (not shown) and one or more interfaces, for example. The program and data memory and/or the computing unit 131 and/or the interfaces may be formed in one structural unit and/or distributed among a plurality of structural units.

The interfaces comprise, for example, supply connections 141, 142 for supplying voltage to the slave control apparatus 21b.

The interfaces also comprise, for example, one or more bus connections 143, 144 for communicating with the master control apparatus 1.

The interfaces comprise, for example, a plurality of connections for actuating a plurality of LED light sources 151, 152.

The interfaces comprise, for example, one or more connections of thermistors 171, 172.

Figure 4:
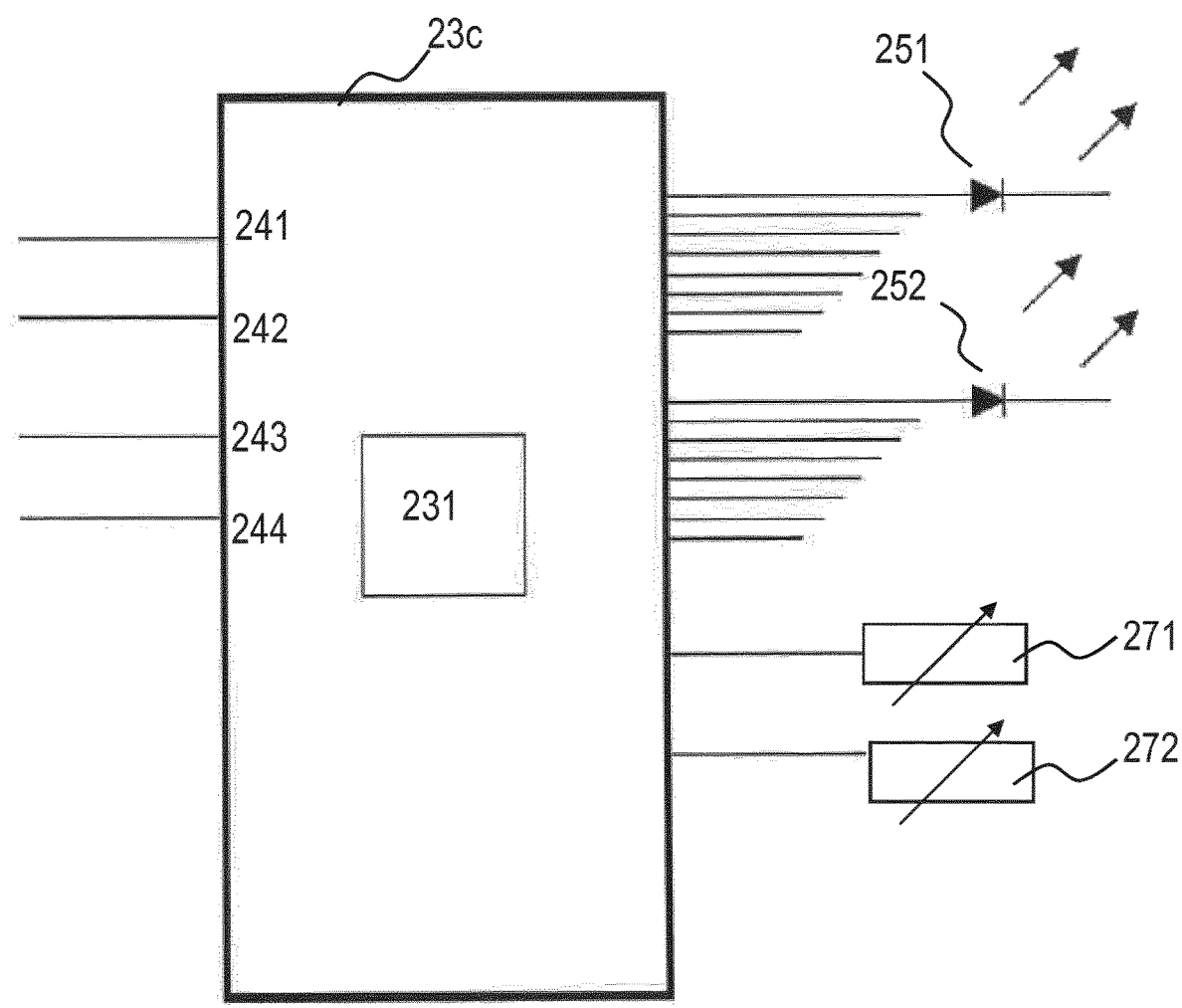
FIG. 4 shows a further slave control apparatus.

FIG. 4 shows an embodiment of the slave control apparatus 21c which is designed to execute application software for the purpose of actuating a matrix vehicle headlight.

The slave control apparatus 21c in FIG. 4 has, in particular, a computing unit 231, a program and data memory (not shown) and one or more interfaces, for example. The program and data memory and/or the computing unit 231 and/or the interfaces may be formed in one structural unit and/or distributed among a plurality of structural units.

The interfaces comprise, for example, supply connections 241, 242 for supplying voltage to the slave control apparatus 21c.

The interfaces also comprise, for example, one or more bus connections 243, 244 for communicating with the master control apparatus 1.

The interfaces comprise, for example, a plurality of connections for actuating a matrix of LED light sources 251, 252, which is symbolized by the multiplicity of lines.

The interfaces comprise, for example, one or more connections of thermistors 271, 272, 273.

The slave control apparatus can also be designed (not shown) to execute any desired application software for the purpose of actuating any desired headlight system component.

The lighting device may also have a plurality of slave control apparatuses 21a which are designed to execute application software for the purpose of actuating a laser vehicle headlight and/or a plurality of slave control apparatuses 21b which are designed to execute application software for the purpose of actuating an LED vehicle headlight and/or a plurality of slave control apparatuses 21c which are designed to execute application software for the purpose of actuating a matrix vehicle headlight.

LIST OF REFERENCE SYMBOLS

1 Master control apparatus
11 Communication interface
13 Supply interface
15 Bus system
17 Voltage supply
20 Headlight housing
21a, 21b, 21c Slave control apparatuses
23a, 23b, 23c Headlight system component
31 Computing unit
41, 42 Supply connections
43, 44 Bus connections
51 Light source
61, 62, 63 Sensors
71, 72, 73 Thermistors
131 Computing unit
141, 142 Supply connections
143, 144 Bus connections
151, 152 Light sources
171, 172 Thermistors
231 Computing unit
241, 242 Supply connections
243, 244 Bus connections
251, 252 Light sources
271, 272 Thermistors The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A lighting device of a vehicle, comprising:
 a master control apparatus;
 a slave control apparatus connected to the master control apparatus via a bus system; and
 a headlight system component including a processor and a plurality of interfaces, the plurality of interfaces including supply interfaces for supplying voltage to the headlight system component, bus connections for communicating via the bus system, a plurality of sensor interfaces connected to sensors and a plurality of thermistor interfaces connected to thermistors;
 wherein the slave control apparatus is designed to execute an application software for the purpose of actuating the headlight system component; and wherein the master control apparatus is designed to:
install the application software on the slave control apparatus, and
at least one of actuate and diagnose the slave control apparatus.

2. The lighting device as claimed in claim 1, further comprising a headlight housing, wherein the slave control apparatus and the headlight system component are arranged in the headlight housing and the master control apparatus is arranged outside the headlight housing.

3. The lighting device as claimed in claim 2, wherein the slave control apparatus is designed to execute the application software for actuating an LED vehicle headlight.

4. The lighting device as claimed in claim 2, wherein the slave control apparatus is designed to execute the application software for actuating a laser vehicle headlight.

5. The lighting device as claimed in claim 2, wherein the slave control apparatus is designed to execute the application software for actuating a matrix vehicle headlight.

6. The lighting device as claimed in claim 2, wherein the master control apparatus is a front headlight master control apparatus or a rear light master control apparatus.

7. The lighting device as claimed in claim 2, wherein the master control apparatus is designed to overwrite a flash memory of a BIOS of the slave control apparatus with a firmware in order to install the application software on the slave control apparatus.

8. The lighting device as claimed in claim 2, wherein the master control apparatus is designed to carry out an error diagnosis of the slave control apparatus.

9. The lighting device as claimed in claim 2, further comprising a plurality of slave control apparatuses, wherein the master control apparatus is designed to:
install the application software on the plurality of slave control apparatuses in a parallel manner, and
at least one of actuate and diagnose the plurality of slave control apparatuses in a parallel manner.

10. The lighting device as claimed in claim 2, wherein the master control apparatus is designed to communicate with an external diagnostic apparatus.

11. The lighting device as claimed in claim 1, wherein the slave control apparatus is designed to execute the application software for actuating an LED vehicle headlight.

12. The lighting device as claimed in claim 1, wherein the slave control apparatus is designed to execute the application software for actuating a laser vehicle headlight.

13. The lighting device as claimed in claim 1, wherein the slave control apparatus is designed to execute any desired application software for actuating any desired headlight system component.

14. The lighting device as claimed in claim 1, wherein the slave control apparatus is designed to execute the application software for actuating a matrix vehicle headlight.

15. The lighting device as claimed in claim 1, wherein the master control apparatus is a front headlight master control apparatus or a rear light master control apparatus.

16. The lighting device as claimed in claim 1, wherein the master control apparatus is designed to overwrite a flash memory of a BIOS of the slave control apparatus with a firmware in order to install the application software on the slave control apparatus.

17. The lighting device as claimed in one claim 1, wherein the master control apparatus is designed to carry out an error diagnosis of the slave control apparatus.

18. The lighting device as claimed in claim 1, further comprising a plurality of slave control apparatuses, wherein the master control apparatus is designed to:
install the application software on the plurality of slave control apparatuses in a parallel manner, and
at least one of actuate and diagnose the plurality of slave control apparatuses in a parallel manner.

19. The lighting device as claimed in claim 1, wherein the master control apparatus is designed to communicate with an external diagnostic apparatus.

* * * * *